No. 724,795. PATENTED APR. 7, 1903.
S. A. BROSTE.
BICYCLE PUMP.
APPLICATION FILED DEC. 13, 1902.
NO MODEL. 2 SHEETS—SHEET 1.
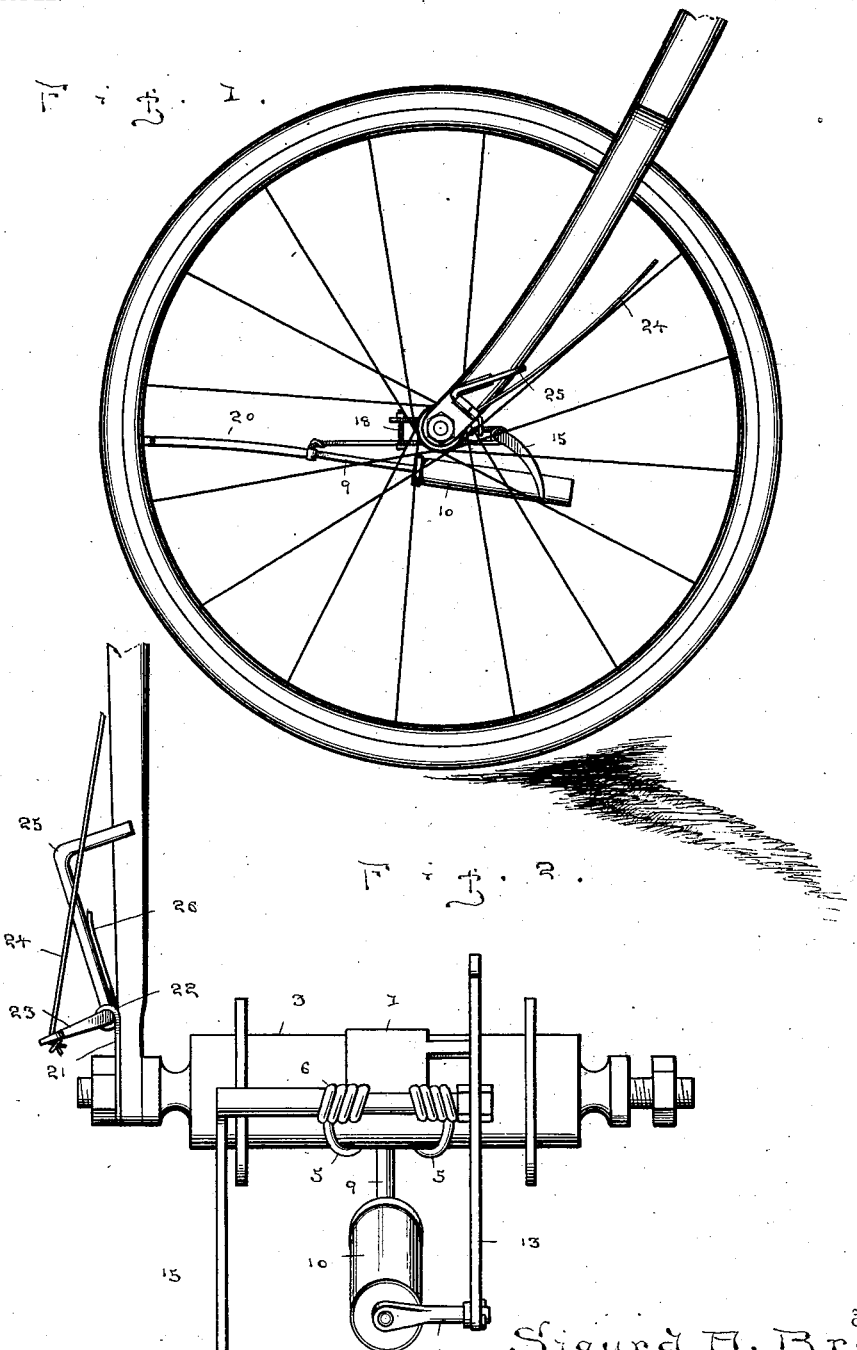

No. 724,795. PATENTED APR. 7, 1903.
S. A. BROSTE.
BICYCLE PUMP.
APPLICATION FILED DEC. 13, 1902.
NO MODEL. 2 SHEETS—SHEET 2.
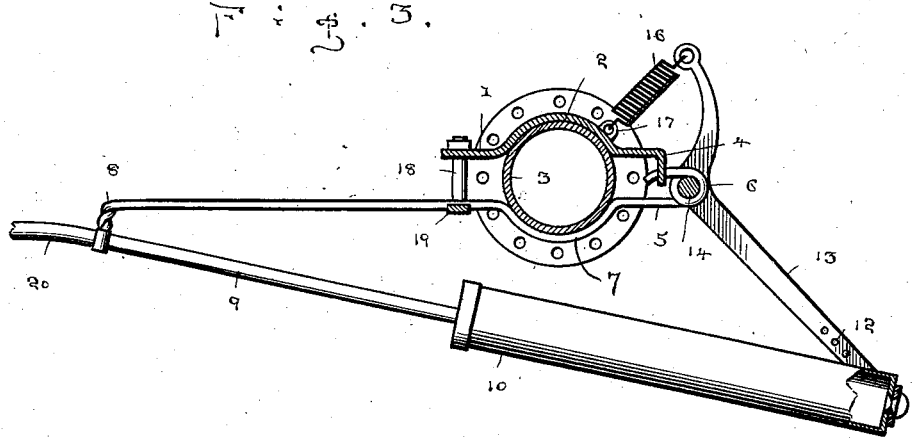
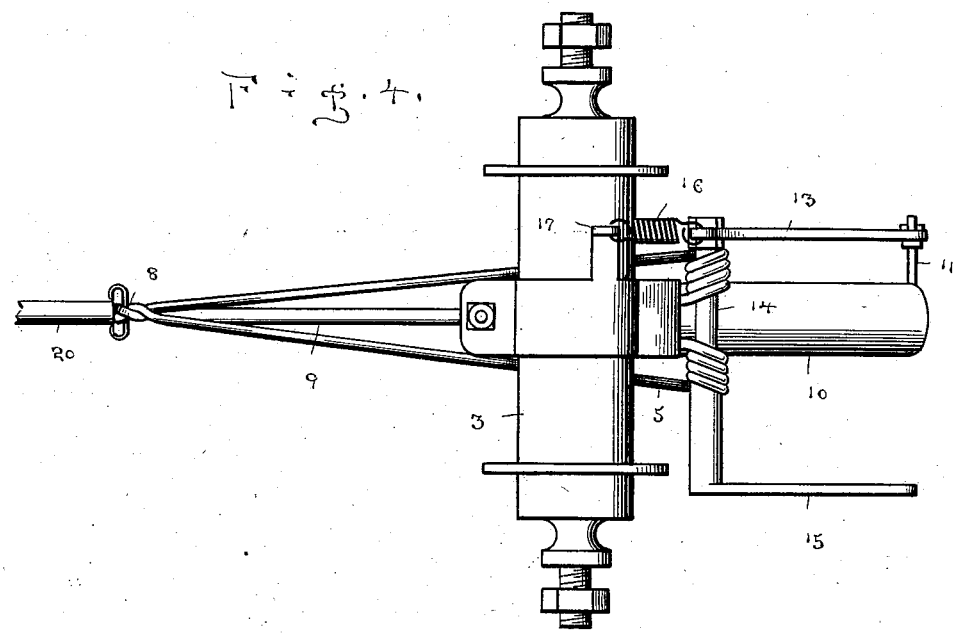
Inventor
Sigurd A. Broste.
Witnesses
By Victor J. Evans
Attorneys

UNITED STATES PATENT OFFICE.

SIGURD A. BROSTE, OF SISSETON, SOUTH DAKOTA.

BICYCLE-PUMP.

SPECIFICATION forming part of Letters Patent No. 724,795, dated April 7, 1903.

Application filed December 13, 1902. Serial No. 135,161. (No model.)

*To all whom it may concern:*

Be it known that I, SIGURD A. BROSTE, a citizen of the United States, residing at Sisseton, in the county of Roberts and State of South Dakota, have invented new and useful Improvements in Bicycle-Pumps, of which the following is a specification.

My invention relates to new and useful improvements in pumps for bicycles and similar devices employing pneumatic tires; and its object is to provide a pump which may be readily attached to the hub of a wheel and which will be automatically operated by said wheel at any desired period during the revolution thereof.

Another object is to so construct the device that the same may be moved into and out of operative position by the rider.

With the above and other objects in view the invention consists in the novel construction and arrangement of the several parts, which will be more fully hereinafter described and claimed.

In the drawings, Figure 1 is a side elevation showing the pump in position with any bicycle-wheel. Fig. 2 is a rear elevation of said pump in position upon the hub of a wheel. Fig. 3 is a section through the mechanism for holding said pump in position upon the hub, and Fig. 4 is a plan view of the pump in position upon a hub.

Referring to the figures by numerals of reference, 1 is a plate having a transverse recess 2 therein adapted to receive the upper portion of a hub 3 of a wheel. On the rear end of this strip is provided a downward extension 4, which is engaged by the ends of rods 5, having alining coils 6 arranged adjacent to said extension 4. From these coils the rods extend forward and are recessed, as at 7, for the reception of the lower portion of the hub 3, and the outer ends of these rods are connected, as at 8, and secured in any suitable manner to the end of a tube 9, extending from a pump-cylinder 10. A piston (not shown) is mounted upon the tube 9 and within cylinder 10, and the rear end of said cylinder is provided with a laterally-extending arm 11, adapted to be bolted or otherwise secured in any one of a series of apertures 12, formed within one end of a bell-crank lever 13. This lever is secured to a shaft 14, journaled within coils 6 and having a curved arm 15 at one end thereof. The short arm of the lever 13 is connected, by means of a coil-spring 16, to an ear 17, formed upon the strip 1, before referred to.

When it is desired to connect this pump to the hub of the wheel, the strip 1 is placed upon said hub and the ends of rods 5 are placed in engagement with the extension 4 of said strip. These rods are then swung upward until the hub 3 is seated in their recesses 7, and a bolt 18, having a head 19, adapted to extend under the two rods 5, is placed into engagement with one end of strip 1 and secured thereto by means of a nut or in any other suitable manner. In this way the hub 3 may be firmly clamped between strip 1 and rods 5, and the pump will be caused to rotate with said hub. The end of tube 9 is then connected to the inlet of the tire of the wheel by means of a preferably flexible tube 20.

When the pump above described is attached to the wheel of a bicycle, a bracket 21 is clamped or otherwise secured to the axle at a point outside the frame or forks, and the shaft 22 is journaled in the upper end thereof and is provided at one end with an outwardly-extending arm 23, adapted to be secured to a cord 24 or other flexible strip extending to a point where it can be readily grasped by the rider. An L-shaped arm 25 is formed at the opposite end of shaft 22 and is adapted when the arm 23 is moved upwardly to swing into the path of arm 15. It will thus be seen that when this arm 25 is in such position the arm 15 will be pressed backward thereby once during each revolution of the wheel, and each time this arm is moved the bell-crank lever 13 is swung upon its shaft and forces cylinder 10 longitudinally upon the tubular piston-rod 9, thereby forcing air into the tire by way of tube 20. As soon as arm 15 escapes from the operating-arm 25 the spring 16 will cause the same, together with the bell-crank lever 13 and cylinder 10, to assume their normal positions. When a sufficient quantity of air has been pumped into the tire, the operation of the pump can be promptly discontinued by releasing the cord 24. The spring 26 will then promptly throw the arm 25 out of the path of arm 15.

It will be seen that the device is extremely simple in construction and readily operated, and by means of the attaching means employed it can be readily secured to the hub of any form of wheel having a pneumatic tire.

In the foregoing description I have shown the preferred form of my invention; but I do not limit myself thereto, as I am aware that modifications may be made therein without departing from the spirit or sacrificing the advantages thereof, and I therefore reserve the right to make such changes as fall within the scope of my invention.

Having thus described the invention, what is claimed as new is—

1. The combination with a frame having a wheel therein; of a clamp secured upon the hub of said wheel, a bell-crank lever journaled upon the clamp, a spring connecting one arm of said lever to the clamp, a pump-cylinder pivoted and adjustably secured to the other arm of the lever, a tubular piston-rod extending from the cylinder, an arm to the clamp connected to and adapted to support said piston-rod, an arm connected to and movable with the bell-crank lever, a second arm pivoted to the frame, and means for swinging said arm into the path of the arm of the lever.

2. The combination with a curved strip; of coiled rods, ends thereto engaging the strip, means for clamping the rods to the strip, a shaft journaled in the coils of the rods, a bell-crank lever at one end and a curved arm at the other end of said shaft, a spring connecting one arm of the lever to the strip, a pivoted pump-cylinder adjustably secured to the bell-crank lever, and a tubular piston-rod extending from the cylinder and having one end secured to and supported by the rods.

3. In a device of the character described, pump-securing means comprising a curved strip, an angular extension thereto, rods having recesses therein, coils in the rods intermediate the ends thereof, said extensions being adapted to receive one end of each rod, a clamping means connecting the arms and strip, a shaft journaled within the coils, a bell-crank lever and an arm at opposite ends of the shaft, and a spring connecting said lever and the strip.

In testimony whereof I have affixed my signature in presence of two witnesses.

SIGURD A. BROSTE.

Witnesses:
JOHN H. KOUTZ,
W. A. KOUTZ.